United States Patent
Ochiai et al.

(10) Patent No.: US 8,480,020 B2
(45) Date of Patent: Jul. 9, 2013

(54) TRAVERSE CAMSHAFT FOR FISHING REEL AND RECIPROCAL MOVEMENT MECHANISM FOR FISHING REEL EMPLOYING THE TRAVERSE CAMSHAFT

(75) Inventors: Koji Ochiai, Osaka (JP); Tetsuo Inoue, Osaka (JP)

(73) Assignee: Shimano Inc., Osaka (JP)

( * ) Notice: Subject to any disclaimer, the term of this patent is extended or adjusted under 35 U.S.C. 154(b) by 861 days.

(21) Appl. No.: 12/649,024

(22) Filed: Dec. 29, 2009

(65) Prior Publication Data

US 2010/0187346 A1 Jul. 29, 2010

(30) Foreign Application Priority Data

Jan. 26, 2009 (JP) ................................. 2009-014110

(51) Int. Cl.
*A01K 89/01* (2006.01)
(52) U.S. Cl.
USPC ........... 242/274; 242/277; 242/278; 242/279; 74/57; 74/567
(58) Field of Classification Search
USPC ................................ 242/273–279; 74/57, 567
See application file for complete search history.

(56) References Cited

U.S. PATENT DOCUMENTS

| | | | | |
|---|---|---|---|---|
| 399,588 A | * | 3/1889 | Washburn | 242/276 |
| 983,013 A | * | 1/1911 | Wright | 242/276 |
| 1,387,855 A | * | 8/1921 | Lippitt | 74/57 |
| 1,448,786 A | * | 3/1923 | Breen | 242/276 |
| 1,557,450 A | * | 10/1925 | Fulda | 242/275 |
| 1,635,629 A | * | 7/1927 | Marcy | 242/276 |
| 1,663,801 A | | 3/1928 | Kautzky, Jr. | |
| 2,155,753 A | * | 4/1939 | Cook | 43/4 |
| 2,251,838 A | * | 8/1941 | Baker | 74/57 |
| 2,609,161 A | * | 9/1952 | Guhlin et al. | 242/277 |
| 2,641,418 A | * | 6/1953 | Miller | 242/277 |
| 3,407,262 A | * | 10/1968 | Snyder, Jr. | 74/57 |
| 3,598,334 A | * | 8/1971 | Fleischer | 242/277 |
| 3,690,579 A | * | 9/1972 | Porter et al. | 242/477.2 |

(Continued)

FOREIGN PATENT DOCUMENTS

| | | |
|---|---|---|
| JP | 56-075876 U | 6/1981 |
| JP | 06-023456 U | 3/1994 |
| JP | 11-346611 A | 12/1999 |
| JP | 2000-139293 A | 5/2000 |

OTHER PUBLICATIONS

The extended European Search Report in corresponding European Application No. 10151565.8, dated May 7, 2010.

*Primary Examiner* — Emmanuel M Marcelo
(74) *Attorney, Agent, or Firm* — Global IP Counselors, LLP

(57) ABSTRACT

In a spinning reel, a traverse camshaft 21 is arranged to engage with an engaging member used to cause a bail arm and a spool to undergo a relative reciprocal movement. The traverse camshaft 21 has a shaft body 37 and a cam groove 38. The shaft body 37 is arranged to rotate in coordination with rotation of a handle assembly in at least a line reel-in direction. The cam groove 38 is formed in an external circumferential surface of the shaft body 37 and configured to engage with the engaging member. The cam groove 38 is also configured to intersect itself. The cam groove 38 has a first groove section 38b and a second groove section 38c on opposite sides of an intersecting portion 38a. The first groove section 38b and the second groove section 38c have different widths at the intersecting portion 38a.

11 Claims, 9 Drawing Sheets

U.S. PATENT DOCUMENTS

| | | | |
|---|---|---|---|
| 4,023,421 A * | 5/1977 | Berlier et al. | 74/57 |
| 5,775,614 A * | 7/1998 | Yamaguchi | 242/261 |
| 6,412,721 B2 * | 7/2002 | Kawabe et al. | 242/278 |
| 6,484,956 B2 * | 11/2002 | Kawabe et al. | 242/278 |
| 7,568,650 B2 * | 8/2009 | Barker | 242/397.2 |
| 2006/0237565 A1 * | 10/2006 | Barker | 242/229 |

\* cited by examiner

US 8,480,020 B2

TRAVERSE CAMSHAFT FOR FISHING REEL AND RECIPROCAL MOVEMENT MECHANISM FOR FISHING REEL EMPLOYING THE TRAVERSE CAMSHAFT

CROSS-REFERENCE TO RELATED APPLICATIONS

This application claims priority to Japanese Patent Application No. 2009-014110 filed on Jan. 26, 2009. The entire disclosure of Japanese Patent Application No. 2009-014110 is hereby incorporated herein by reference.

BACKGROUND OF THE INVENTION

1. Field of the Invention

The present invention relates to a traverse camshaft for a fishing reel and a reciprocal movement mechanism for a fishing reel. More specifically, the present invention relates to a traverse camshaft configured to engage with an engaging member that is used to cause a fishing line guide section and a spool of a fishing reel to undergo a relative reciprocal movement and to a reciprocal movement mechanism that employs such a traverse camshaft.

2. Background Information

Reciprocal movement mechanisms for fishing reels such as an oscillating mechanism of a spinning reel and a level wind mechanism of a dual-bearing reel use a traverse camshaft to cause a fishing line guide section and a spool to undergo a relative reciprocal movement in an axial direction. In a spinning reel, a spool is mounted on a tip end of a spool shaft and a traverse camshaft is used to move the spool shaft reciprocally with respect to a fishing line guide section. In a dual-bearing reel, a traverse camshaft is used to cause a fishing line guide section to move reciprocally with respect to a spool.

A cam groove having a fixed width and configured to intersect itself is formed in an external circumferential surface of the traverse camshaft used in these reciprocal movement mechanisms. The cam groove is configured to engage with an engaging member provided on a slider of an oscillating mechanism or a fishing line guide section of a level wind mechanism. The engaging member turns as it moves along the cam groove while being engaged with the cam groove, thereby causing the slider or fishing line guide section to move reciprocally along the spool.

In a conventional reciprocal movement mechanism, a middle portion of an engaging section of the engaging member is configured to have a larger width and both end portions of the engaging section are configured to have a narrower width than that of the middle portion. Japanese Laid-Open Patent Publication No. 2000-139293 shows this type of mechanism.

In a conventional reciprocal movement mechanism, the width of the cam groove of the traverse camshaft is the same at all points along the cam groove and the width of the middle portion of the engaging section of the engaging member is wider than both ends of the same. As a result, a tip end of the engaging member is prevented from catching in an intersecting portion of the cam groove and causing an abnormal noise to occur or an operating feel to be degraded.

However, since the engaging section of the engaging member is configured such that the middle portion is thicker in a thickness direction and both ends are thinner in the thickness direction, contact of the engaging member against the cam groove is limited to the middle portion. Consequently, the engaging member can easily turn unnecessarily with respect to the cam groove and change the contact state between the engaging member and cam groove, possibly degrading the rotational operating feel of the reel due to a change in resistance. Also, such turning of the engaging member at an intersecting portion of the cam groove can cause the engaging member to contact the intersecting portion and to generate an abnormal or undesirable noise.

In view of the above, it will be apparent to those skilled in the art from this disclosure that there exists a need for an improved traverse camshaft for a fishing reel and reciprocal movement mechanism for the fishing reel employing the traverse camshaft. This invention addresses this need in the art as well as other needs, which will become apparent to those skilled in the art from this disclosure.

SUMMARY OF THE INVENTION

One object of the present invention is to provide a traverse camshaft for a fishing reel that can suppress unnecessary turning of the engaging member and thereby suppress an occurrence of abnormal noise and degradation of the operating feel for a user.

A traverse camshaft for a fishing reel according to one aspect is configured to engage with an engaging member used to cause a fishing line guide section and a spool of a fishing reel to undergo a relative reciprocal movement. The traverse camshaft includes a shaft body and an endless spiral cam groove. The shaft body is arranged such that it can rotate in coordination with rotation of a handle of the fishing reel in at least a line reel-in direction. The cam groove is formed in an external circumferential surface of the shaft body and configured to engage with the engaging member. The cam groove is also configured to intersect itself. The cam groove has a first groove section and a second groove section. The second groove section has a width that is different from that of the first groove section at the intersecting portion.

A traverse camshaft for a fishing reel according to another aspect is configured to engage with an engaging member used to cause a fishing line guide section and a spool of a fishing reel to undergo a relative reciprocal movement. The traverse camshaft includes a shaft body and an endless spiral cam groove. The shaft body is arranged such that it can rotate in coordination with rotation of a handle of the fishing reel in at least a line reel-in direction. The cam groove is formed in an external circumferential surface of the shaft body and configured to engage with the engaging member. The cam groove is also configured to intersect itself. The cam groove has a plurality of first groove sections arranged rotationally downstream from at least one intersecting portion and a plurality of second groove sections. The second groove sections are wider than the first groove sections and arranged rotationally upstream from the intersecting portion. Here, "rotationally downstream" refers to a rotational direction corresponding to the reel-in direction of the shaft body and "rotationally upstream" refers to the opposite direction of the reel-in direction. In other words, as the camshaft rotates in the reel-in direction, a first component that is rotationally upstream a second component on the camshaft will reach a point after the second component that is rotationally downstream the first component reaches it.

In a reciprocal movement mechanism constructed using a traverse camshaft configured according this aspect of the invention, when the traverse camshaft rotates in a line reel-in direction, the engaging member moves along the cam groove so as to pass from the narrower first groove sections, through the intersecting portion, to the wider second groove sections. Thus, the engaging member repeatedly performs a movement in which it is restricted by the narrower first groove sections, enters the intersecting portion, and moves on to the wider second groove sections. As a result, the engaging member is less likely to undergo unnecessary turning in the first groove sections and less likely to contact the intersecting portion. After the engaging member passes the intersecting portion, it does not readily contact the second groove sections because the second groove sections are wider.

Since the engaging member engages with the narrower first groove sections at a position rotationally downstream of the intersecting portion, i.e., at a position along the groove that the engaging member reaches just before reaching the intersecting portion when the traverse camshaft is rotated in the reel-in direction, unnecessary turning of the engaging member is suppressed before the engaging member enters the intersecting portion and the engaging member is less likely to contact the intersecting portion. Thus, the occurrence of abnormal noise and degradation of the operating feel caused by contact of the engaging member against the intersection portion are suppressed. Additionally, since the groove width widens when the engaging member passes the intersecting portion, the engaging member does not readily contact the second groove portion and the operating feel is less likely to decline. Consequently, unnecessary turning of the engaging member is suppressed and the occurrence of abnormal noise and degradation of the operating feel can also be suppressed.

In a traverse camshaft for a fishing reel according to another aspect, the cam groove is configured to have an isosceles trapezoidal cross-sectional shape such that the cam groove is wider at an external circumferential surface of the traverse camshaft and narrower at a bottom of the cam groove. With this aspect, since the cam groove has an isosceles trapezoidal cross-sectional shape, the same tool (e.g., a milling cutter, an end mill, a slotter, or a turning tool) can be used to change the width of the cam groove while changing the depth of the cam groove. Consequently, the same type of tool can be used to machine the groove sections having different widths in a continuous fashion.

In a traverse camshaft for a fishing reel according to still another aspect of the invention, the cam groove is configured such that the first groove sections are shallower than the second groove sections. With this aspect, the groove width can be narrowed by making the groove shallower because the groove width can be changed by changing the groove depth.

In a traverse camshaft for a fishing reel according to still another aspect, the cam groove has third groove sections arranged rotationally upstream from the second groove sections, and the third groove sections are narrower than the second groove sections and wider than the first groove sections. With this aspect, third groove sections that are narrower than the second groove sections are formed rotationally upstream of the second groove sections between the second groove sections and the next upstream first groove sections. Consequently, the engaging member is restricted by the third groove sections that are narrower than the second groove sections as it moves from the second groove sections to the next upstream first groove sections and the engaging member can be guided more smoothly into the first groove sections. As a result, rocking of the engaging member can be suppressed to an even greater degree.

In a traverse camshaft for a fishing reel according to still another aspect of the invention, the cam groove has fourth or end groove sections that are wider than the second groove sections and arranged at each of two end portions of the intersecting cam groove. With this aspect, the cam groove is configured to be widest at both end portions where the radius of curvature is small and the engaging member is more likely to contact the groove so that the engaging member moves smoothly through both end portions of the cam groove.

A reciprocal movement mechanism for a fishing reel according to still another aspect is a mechanism for reciprocally moving a spool of a spinning reel. The reciprocal movement mechanism includes a traverse camshaft according to any one of the previously explained first to fifth aspects, a transmission mechanism, a slider, and a guide section. The transmission mechanism is contrived to transmit rotation of a handle to the traverse camshaft. An engaging member configured to engage with a cam groove of the traverse camshaft is turnably mounted in the slider, and a spool shaft is connected to the slider such that it cannot move in at least an axial direction. The guide section serves to guide the slider in a reciprocal movement direction.

With this reciprocal movement mechanism, the slider moves reciprocally when the traverse camshaft rotates in the line reel-in direction. The same effects as obtained with any one of the first to fifth aspects of the invention can also be obtained with this reciprocal movement mechanism.

A reciprocal movement mechanism for a fishing reel according to another aspect is a mechanism for reciprocally moving a fishing line guide section of a dual-bearing reel and includes a traverse camshaft according to any one of the previously explained first to fifth aspects that is arranged substantially parallel and adjacent to a spool shaft connected to a spool, a transmission mechanism, an engaging member, and a guide section. The transmission mechanism is a mechanism contrived to transmit rotation of a handle in at least a line reel-in direction to the traverse camshaft. The engaging member is a member that is turnably mounted to the fishing line guide section and configured to engage with the cam groove of the traverse camshaft. The guide section serves to guide the fishing line guide section in a reciprocal movement direction.

With this reciprocal movement mechanism, the fishing line guide section moves reciprocally when the traverse camshaft rotates in the line reel-in direction. The same effects as obtained with any one of the first to fifth aspects of the invention can also be obtained with this reciprocal movement mechanism.

With invention reel having any of the aforementioned aspects, since the engaging member engages with the usually narrower first groove sections at a position downstream of the intersecting portion, i.e., at a position along the cam groove that the engaging member reaches just before reaching the intersecting portion when the traverse camshaft is rotated in the reel-in direction, unnecessary turning of the engaging member is suppressed before the engaging member enters the intersecting portion and the engaging member is less likely to contact the intersecting portion. Thus, the occurrence of abnormal noise and degradation of the operating feel caused by contact of the engaging member against the intersection portion are suppressed. Additionally, since the groove width can widen after the engaging member passes the intersecting portion, the engaging member does not readily contact the second groove portion and the operating feel is less likely to decline. Consequently, unnecessary turning of the engaging member is suppressed and the occurrence of abnormal noise and degradation of the operating feel can be suppressed.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

General Description

Figure 1:
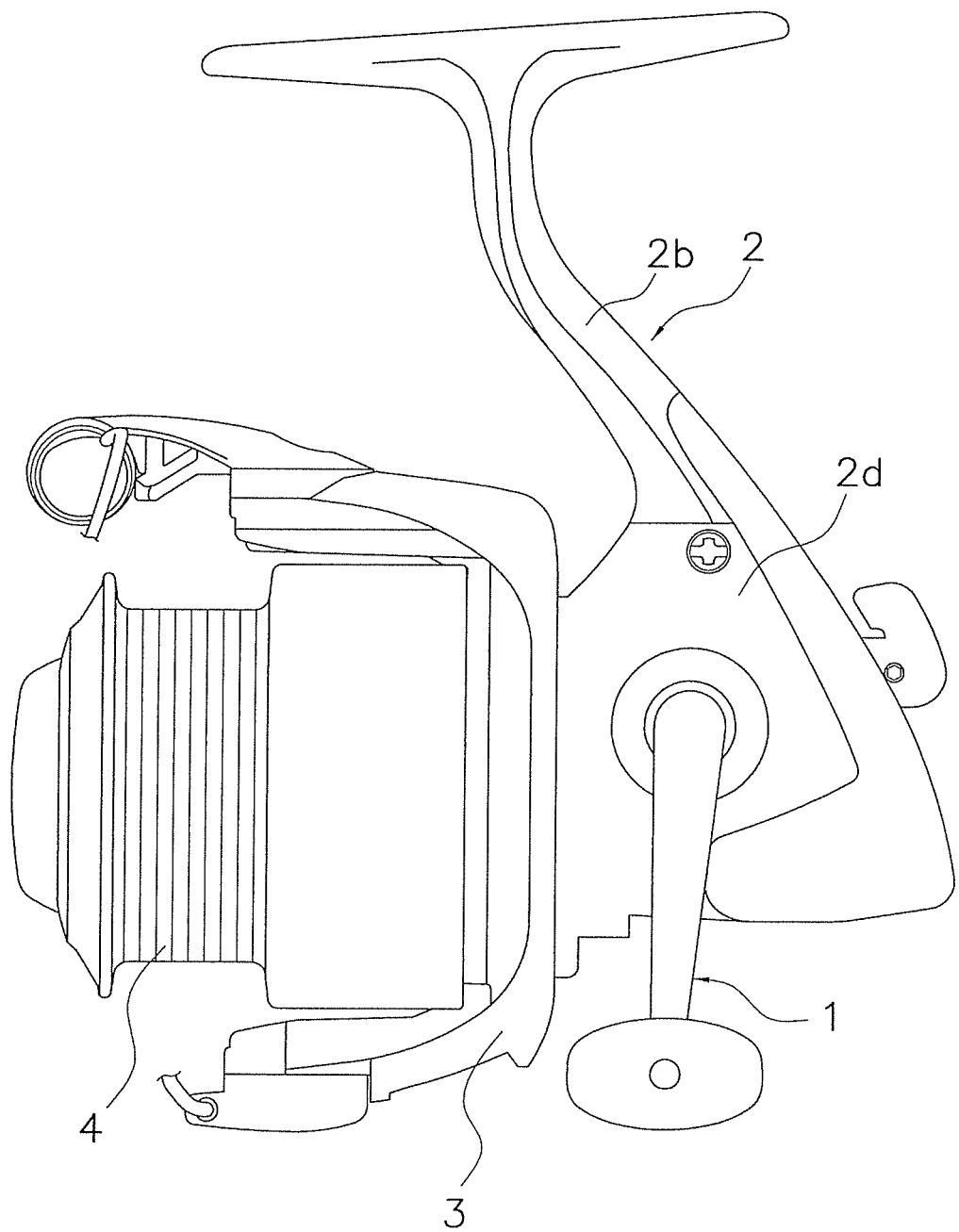
FIG. 1 is a side elevational view of a spinning reel in accordance a first embodiment.

As shown in FIG. 1, a spinning reel according to a first embodiment has a reel unit 2, a handle assembly 1, a rotor 3, and a spool 4. The reel unit 2 is arranged such that it can be mounted to a fishing rod. The handle assembly 1 is mounted to the reel unit 2 such that it can rotate about a transverse axis (axis running left to right). The rotor 3 is arranged to rotate in coordination with rotation of the handle assembly 1 and to guide a fishing line to the spool 4. The rotor 3 is rotatably supported on a front portion of the reel unit 2 such that it can rotate about a longitudinal axis. The spool 4 is arranged in front of the rotor 3 such that can move reciprocally along a longitudinal axis and such that the fishing line guided by the rotor 3 can be wound onto an external circumferential surface of the spool 4.

Constituent Features of the Reel Unit

Figure 2:
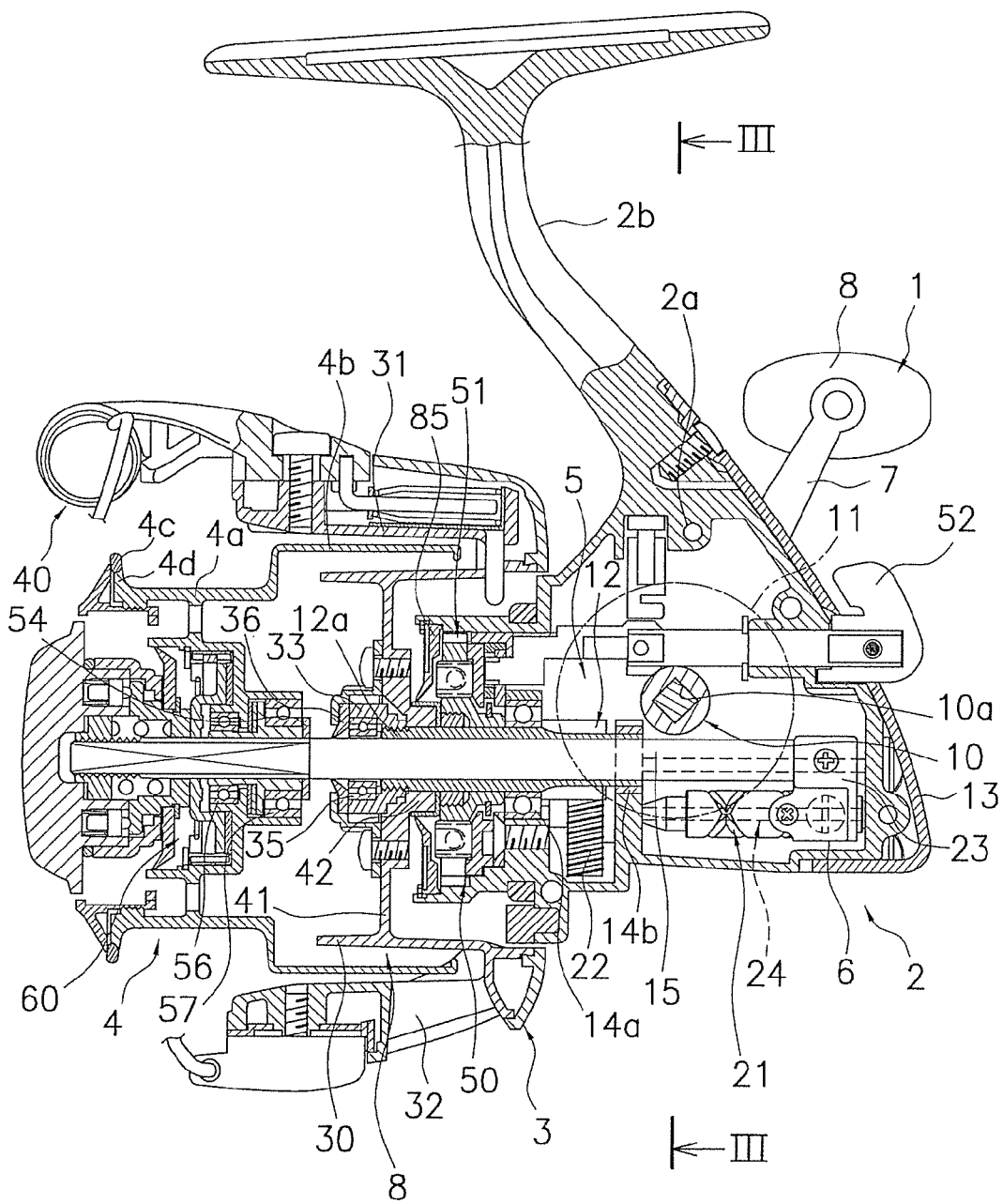
FIG. 2 is a side cross-sectional view of the spinning reel of FIG. 1.
Figure 3:
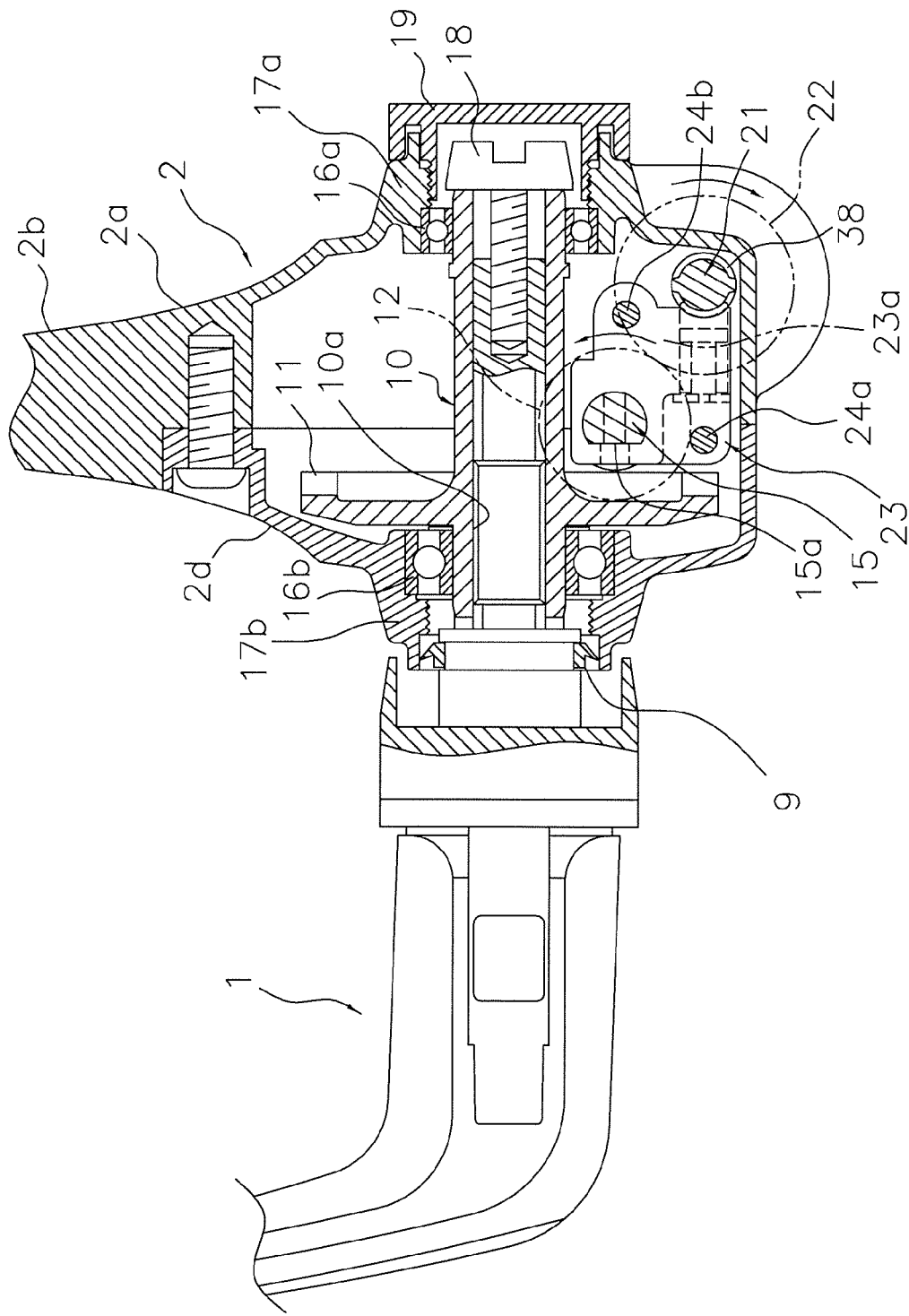
FIG. 3 is a cross-sectional view taken along the section line of FIG. 2.

As shown in FIGS. 2 and 3, the reel unit 2 has a reel body 2a, a T-shaped rod mounting foot 2b, and a lid member 2d. The reel body 2a forms a main portion of the reel unit 2 and has an opening in a side portion thereof. The T-shaped rod mounting foot 2b is configured to extend diagonally upward and frontward from the reel body 2a. The lid member 2d is configured to be fastened to the reel body 2a with a screw so as to block or to cover the opening of the reel body 2a.

The reel body 2a has an internal space that communicates with the opening and serves as a mechanism mounting space. As shown in FIG. 2, a rotor drive mechanism 5 and an oscillating mechanism 6 (example of a reciprocal movement mechanism) are provided in the space. The rotor drive mechanism 5 is arranged to rotate the rotor 3 in coordination with the rotation of the handle assembly 1, and the oscillating mechanism 6 is arranged to move the spool 4 back and forth so as to wind a fishing line in a uniform manner.

As shown in FIG. 3, a cylindrical boss section 17a is formed on a right side face of the reel body 2a. The boss section 17a is configured to extend inward and outward with respect to the reel body 2a in order to house a bearing 16a that supports a right end of a master gear shaft 10. A boss section 17b is formed on the lid member 2d in a position opposite the boss section 17a. The boss section 17b is configured to extend inward and outward with respect to the reel body 2a in order to house a bearing 16b that supports a left end of the master gear shaft 10. The boss section positioned on the side opposite the side on which the handle assembly 1 is mounted (the boss section 17a in example shown in FIG. 3) is plugged with a water protective cap 19. The water protective cap 19 has a bottomed cylinder-like shape and is configured to be screwed into an internal circumferential surface of the boss section 17a or the boss section 17b.

As shown in FIG. 2, a rear portion of the reel unit 2 is covered with a protective cover 13 made of, for example, a metal or synthetic resin material. The protective cover 13 is arranged to cover a bottom portion and a back surface of the reel unit 2 from a portion below the reel body 2a and the lid member 2d to the back surface and the reel mounting foot 2b. The protective cover 13 is detachably fastened to the reel unit 2 by a screw.

Constituent Features of the Handle Assembly

As shown in FIGS. 2 and 3, the handle assembly 1 is a member detachably mounted to the master gear shaft 10 such that it can rotate integrally with the master gear shaft 10. The handle assembly 1 includes a handle body 7, a grip part 8 mounted to the handle body 7, and a seal member 9 mounted to the handle body 7. The handle assembly 1 can be attached to the reel unit 2 from either the right side (FIG. 1) or the left side (FIG. 2).

Constituent Features of the Rotor Drive Mechanism

As shown in FIGS. 2 and 3, the rotor drive mechanism 5 has a master gear 11 on which the handle assembly 1 is non-rotatably mounted and a pinion gear 12 arranged and configured to mesh with the master gear 11.

The master gear 11 is a face gear formed integrally with the master gear shaft 10. The master gear shaft 10 is a hollow member made of, for example, stainless steel and a non-circular (e.g., rectangular, hexagonal, octagonal, etc.) engaging hole 10a is formed in a center of the master gear shaft 10. Both ends of the master gear shaft 10 are rotatably supported with respect to the reel body 2a and the lid member 2d with bearings 16a and 16b. The master gear shaft 10 rotates integrally with the handle body 7 because the handle body 7 is engaged with the engaging hole 10a.

As shown in FIG. 2, the pinion gear 12 is a cylindrical member arranged to extend along a longitudinal direction and rotatably mounted to the reel body 2a. A front section 12a of the pinion gear 12 passes through a center portion of the rotor 3 and a nut 33 is installed on the front section 12a so as to fasten the pinion gear 12 to the rotor 3. An axially middle portion and an axially rearward portion of the pinion gear 12 are supported rotatably on the reel body 2a by a bearing 14a and a bearing 14b, respectively. A spool shaft 15 passes through a center portion of the pinion gear 12. The pinion gear 12 meshes with the master gear 11 and with the oscillating mechanism 6.

Constituent Features of the Rotor

The rotor 3 has a cylindrical section 30 fastened to the pinion gear 12, a first rotor arm 31 and a second rotor arm 32 arranged facing opposite each other on opposite sides of the cylindrical section 30, and a bail arm 40 (example of a fishing line guide section) for guiding a fishing line to the spool 4. The cylindrical section 30 and the rotor arms 31 and 32 are, for example, made of an aluminum alloy and formed as a one-piece integral unit or a one-piece unitary member.

A front wall 41 is formed on a front portion of cylindrical section 30 and a rearwardly protruding boss section 42 is formed on a center portion of the front wall 41. A non-circular through hole configured to connect integrally-rotatably to the pinion gear 12 is formed in a center portion of the boss section 42, and the front section 12a of the pinion gear 12 is connected to the through hole such that the boss section 42 can rotate integrally with the pinion gear 12.

A nut 33 is screwed onto the front section 12a of the pinion gear 12, and the boss section 42 is non-rotatably fastened to a tip end portion of the pinion gear 12 by the nut 33. A bearing 35 is arranged inside the nut 33. The bearing 35 serves to secure a space between the spool shaft 15 and the internal surface of the pinion gear 12. A seal member 36 having a lip on an internal circumference thereof is mounted on a front surface of the nut 33 and the bearing 35. A tip end of the seal member 36 contacts the spool shaft 15. As a result, liquids are prevented from penetrating the inside of the reel unit 2 from the spool shaft 15.

A reverse rotation preventing mechanism 50 is arranged adjacent to the boss section 42. The reverse rotation preventing mechanism 50 includes a one-way clutch 51 and a switching mechanism 52 configured to switch the one-way clutch between an engaged state (reverse rotation prohibited) and a disengaged state (reverse rotational allowed).

The one-way clutch 51 is a roller-type one-way clutch with a freely rotating inner race. The one-way clutch 51 is sealed by a shaft seal 85 that has a lip and is arranged in front of the one-way clutch 51.

Constituent Features of the Oscillating Mechanism

Figure 4:
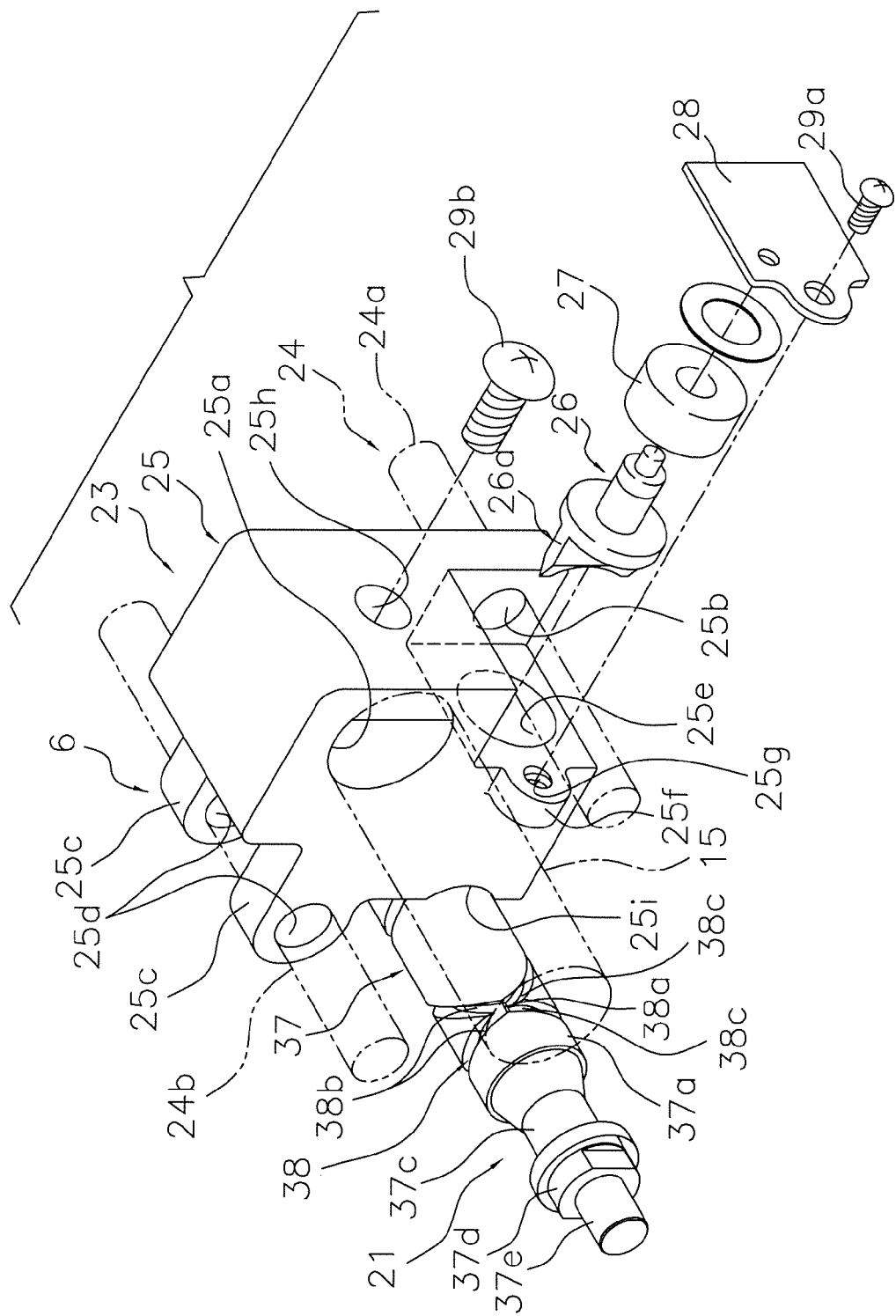
FIG. 4 is an exploded perspective view of a slider of an oscillating mechanism of the spinning reel.

As shown in FIGS. 2 to 4, the oscillating mechanism 6 is a mechanism arranged to move the spool 4 reciprocally in a longitudinal direction by moving the spool shaft 15 in the same direction. A center portion of the spool 4 is connected to a tip end of the spool shaft 15 through a drag mechanism 60 such that the spool 4 moves longitudinally together with the spool shaft 15.

The oscillating mechanism 6 has a traverse camshaft 21 arranged diagonally below the spool shaft 15 such that it is substantially parallel to the spool shaft 15, an intermediate gear 22 (example of a transmission mechanism) for transmitting rotation of the rotor 3 to the traverse camshaft 21, a slider 23 connected to a rearward end of the spool shaft 15 non-rotatably and non-moveably in an axial direction, and a guide section 24 arranged to guide the slider 23 in an axial direction of the spool 4. The slider 23 has an engaging member 26 configured to engage with the traverse camshaft 21.

Constituent Features of the Traverse camshaft

Figure 5:
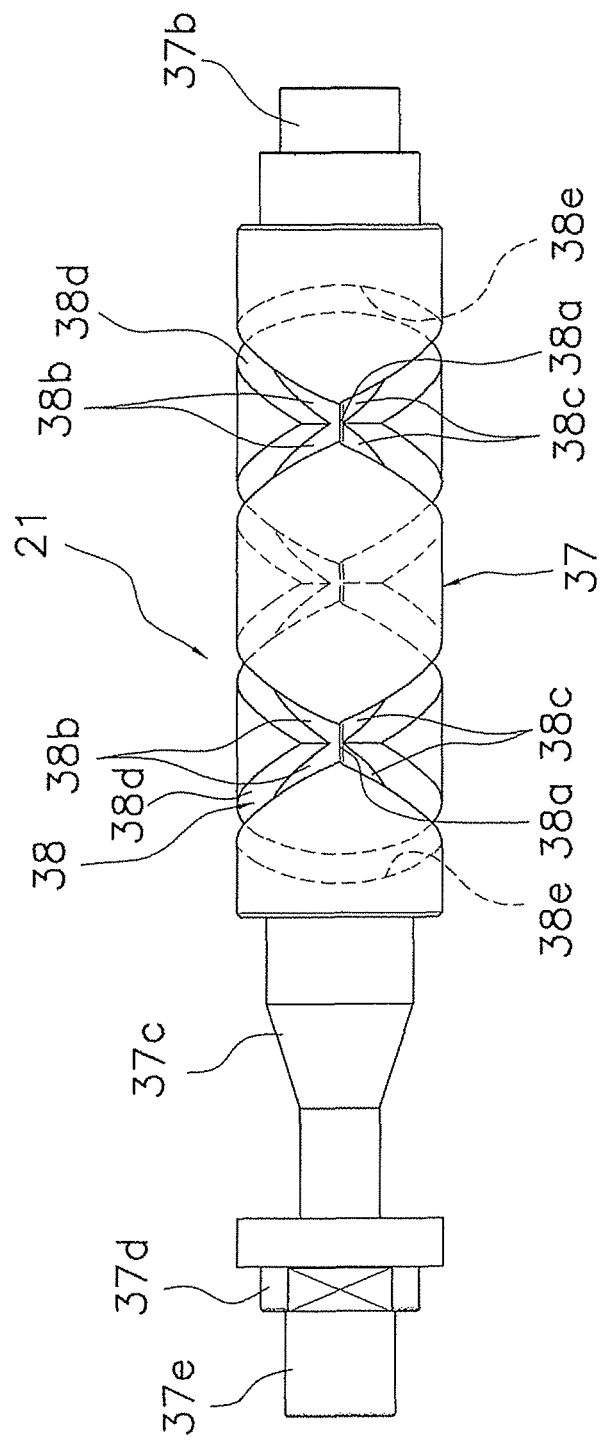
FIG. 5 is a side view of a traverse camshaft of the oscillation mechanism.

As shown in FIGS. 4 and 5, the traverse camshaft 21 is, for example, a metal member made of brass and treated with a surface coating. The traverse camshaft 21 has a shaft body 37 and a self-intersecting endless spiral cam groove 38 formed in an external circumferential surface of the shaft body 37. The shaft body 37 is rotatably supported in the reel body 2a and arranged such that it can rotate in coordination with rotation of the handle assembly 1. The shaft body 37 has a larger diameter grooved section 37a in which the cam groove 38 is formed, a rear support section 37b, a tapered section 37c, a gear support section 37d, and a front support section 37e. The rear support section 37b is formed on a rear end of the grooved section 37a and rotatably supported on a bearing in a rearward end portion of the reel body 2a. The tapered section 37c is configured such that its diameter gradually decreases toward a front end of the grooved section 37a. The gear support section 37d has a non-circular shape configured such that the intermediate gear 22 can be integrally-rotatably connected to the gear support section 37d. Portions of the gear support section 37d can be curved or semi-circular as long as the entire peripheral shape does not form a circle. The front support section 37e is rotatably supported on a bearing in a frontward portion of the reel body 2a.

As shown in FIGS. 5 to 9, the earn groove 38 formed in an external circumferential surface of the shaft body 37 is configured to engage with the engaging member 26 and to intersect with itself. The cam groove 38 has first groove sections 38b, second groove sections 38c each arranged adjacent to a first groove sections 38b with an intersection portion 38a in-between, third groove sections 38d arranged adjacent to the second groove sections 38c, and fourth or end groove sections 38e arranged between third groove sections 38d at each of both end portions of the grooved section 37a of the shaft body 37.

Figures 6A, 6B, 6C, 6D:
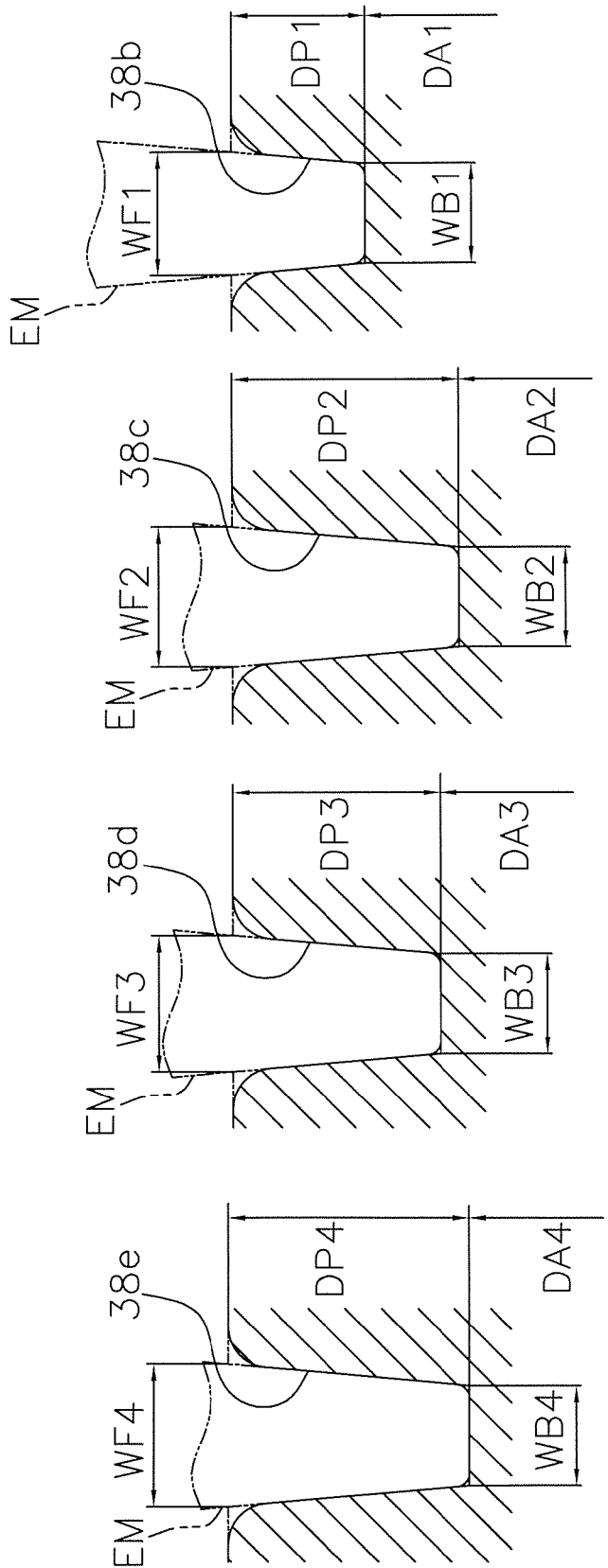
FIGS. 6A to 6D show cross-wise cross-sectional views of different sections of a cam groove of the traverse camshaft.

The first groove sections 38b are positioned rotationally downstream of the intersecting portions 38a, i.e., at positions along the cam groove that the engaging member 26 reaches just before reaching the intersecting portions 38a when the traverse camshaft 21 is rotated in a line reel-in direction. The first groove sections 38b are configured and arranged to engage with the engaging member 26 before the engaging member 26 passes through each of the intersecting portions 38a. As shown in FIG. 6A, an outer width WF1 of the first groove sections 38b at the external circumferential surface of the grooved section 37a of the shaft body 37 is the narrowest among the widths of the four groove sections 38b to 38e. A cross section of the first groove sections 38b is shaped like an isosceles trapezoid such that a width WB1 at a bottom of a first groove section 38b (portion closest to the axis of rotation of the camshaft 21) is smaller than the outer width WF1. A depth DP1 of each of the first groove sections 38b is the shallowest among the depths of the four groove sections 38b to 38e. Thus, a diameter DA1 at a bottom surface of each of the second groove sections 38b is the largest among corresponding diameters of the four groove sections 38b to 38e.

The second groove sections 38c are positioned rotationally upstream of the intersecting portions 38a, i.e., upstream when the traverse camshaft 21 is rotated in a line reel-in direction. The second groove sections 38c are configured and arranged to engage with the engaging member 26 after the engaging member 26 passes through each of the intersecting portions 38a. As shown in FIG. 6B, an outer width WF2 of each of the second groove sections 38c at the external circumferential surface of the grooved section 37a of the shaft body 37 is wider than the outer width WF1 of each of the first groove sections 38b and is the second widest among the widths of the four groove sections 38b to 38e. A cross section of each of the second groove sections 38c is shaped like an isosceles trapezoid such that a width WB2 at a bottom of each of the second groove sections 38c is smaller than the outer width WF2. A depth DP2 of each of the second groove sections 38c is the second deepest among the depths of the four groove sections 38b to 38e. Thus, a diameter DA2 at a bottom surface of each of the second groove sections 38c is the second smallest among corresponding diameters of the four groove sections 38b to 38e.

The third groove sections 38d are positioned rotationally upstream of the second groove sections 38c, i.e., upstream when the traverse camshaft 21 is rotated in a line reel-in direction. The third groove sections 38d are thus configured and arranged to engage with the engaging member 26 after the engaging member 26 passes through each of the second groove sections 38c. As shown in FIG. 6C, an outer width WF3 of each of the third groove sections 38d at the external circumferential surface of the grooved section 37a of the shaft body 37 is wider than the outer width WF1 of each of the first groove sections 38b and is narrower than the outer width WF2 of each of the second groove sections 38c. The outer width WF3 of each of the third groove sections 38d is the second narrowest among the widths of the four groove sections 38b to 38e. A cross section of each of the third groove sections 38d is shaped like an isosceles trapezoid such that a width WB3 at a bottom of a third groove sections 38d are smaller than the outer width WF3. A depth DP3 of each the third groove sections 38d is the second shallowest among the depths of the four groove sections 38b to 38e. Thus, a diameter DA2 at a bottom surface of each of the third groove sections 38c is the second largest among corresponding diameters of the four groove sections 38b to 38e.

Each of the third groove sections 38d located along a middle portion of the grooved section 37a is arranged between a first groove section 38b and a second groove section 38c, and each of the third groove sections 38d located at both ends of the grooved section 37a is arranged adjacent to one of the fourth groove sections 38e.

Each of the fourth groove sections 38e located at the ends of the grooved section 37a is arranged between two third groove sections 38d. The fourth groove sections 38e are arranged at the ends of the range across witch the slider 23 moves reciprocally and constitute the portions of the cam groove 38 where the radius of curvature is the smallest. As shown in FIG. 6D, an outer width WF4 of each of the fourth groove sections 38e at the external circumferential surface of the grooved section 37a of the shaft body 37 is the widest among the widths of the four groove sections 38b to 38e. A cross section of each of the fourth groove sections 38e is shaped like an isosceles trapezoid such that a width WB4 at a bottom of each of the fourth groove sections 38e is smaller than the outer width WF4. A depth DP4 of each of the fourth groove sections 38e is the deepest among the depths of the four groove sections 38b to 38e.

Thus, a diameter DA4 at a bottom surface of the fourth groove sections 38e is the smallest among corresponding diameters of the four groove sections 38b to 38e.

The slopes of the slanted sides of the four isosceles trapezoidal groove sections 38b to 38e are substantially the same. Consequently, all four types of groove sections 38b to 38e can be formed by machining them into the external surface of the grooved section 37a with an end mill EM having a corresponding truncated cone-like shape while setting the depths of the groove sections 38b to 38e to the respective depths DP1 to DP4.

In the first embodiment, as shown in FIG. 5, the cam groove 38 has three intersecting portions 38a: two on the side shown in FIG. 5 and one on the side hidden in FIG. 5. The first groove sections 38b and the second groove sections 38c are arranged with the three intersecting portions 38a in-between. The number of intersecting portions can be set as appropriate based on such factors as a stroke of the spool 4 and a line winding interval size.

Figure 7:
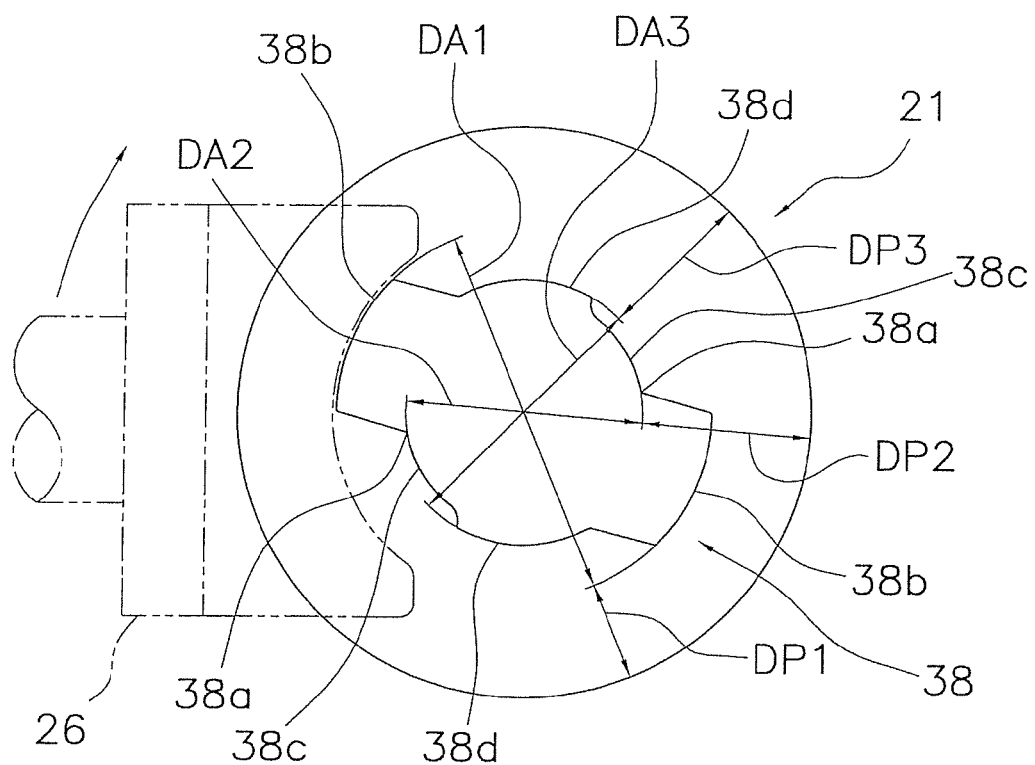
FIG. 7 illustrates a path followed by a tip of a tool when machining an intermediate portion of the cam groove.
Figure 8:
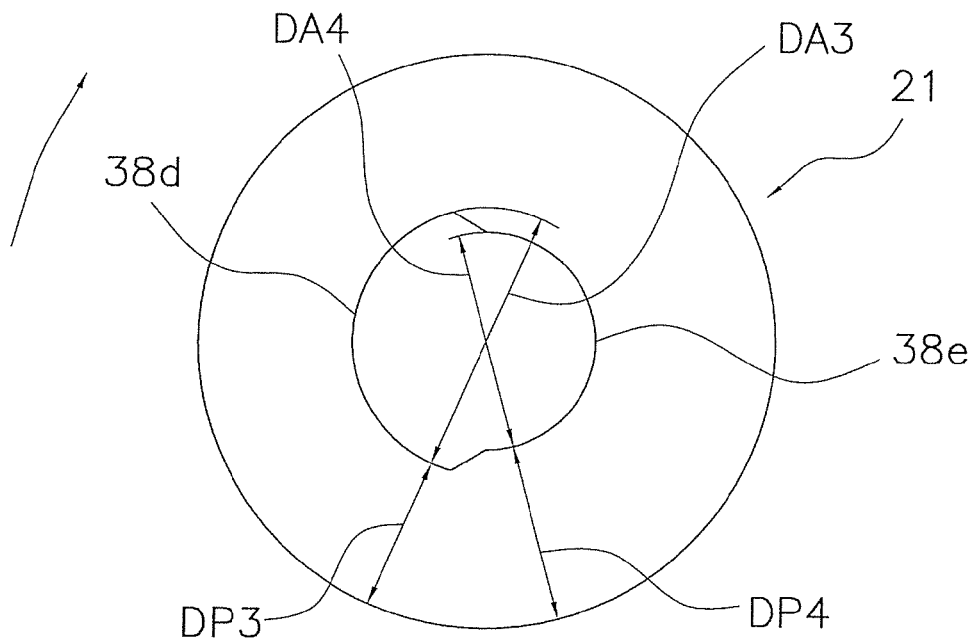
FIG. 8 illustrates a path followed by a tip of a tool when machining one of the two end portions of the cam groove.

FIGS. 7 and 8 show a rotational-direction path of a tip end of the end mill EM as viewed from a rearward side of the traverse camshaft 21. FIG. 7 shows a path followed making an intermediate portion of the cam groove 38 and FIG. 8 shows a path followed making an end portion of the cam groove 38. When machining the cam groove 38, the tip of the end mill EM is arranged facing toward a center axis of the work piece that will become the traverse camshaft 21. The work piece is rotated at a low speed while the end mill EM is rotated and moved by a machine head. The machine head is moved along a feed direction (axial direction of work piece) and a depth direction (radial direction of the work piece) while pointing the end mill EM toward a center of the work piece controlling a penetration depth and feed speed of the end mill EM. As a result, a cam groove 38 having a varying depth is formed.

Figure 9:
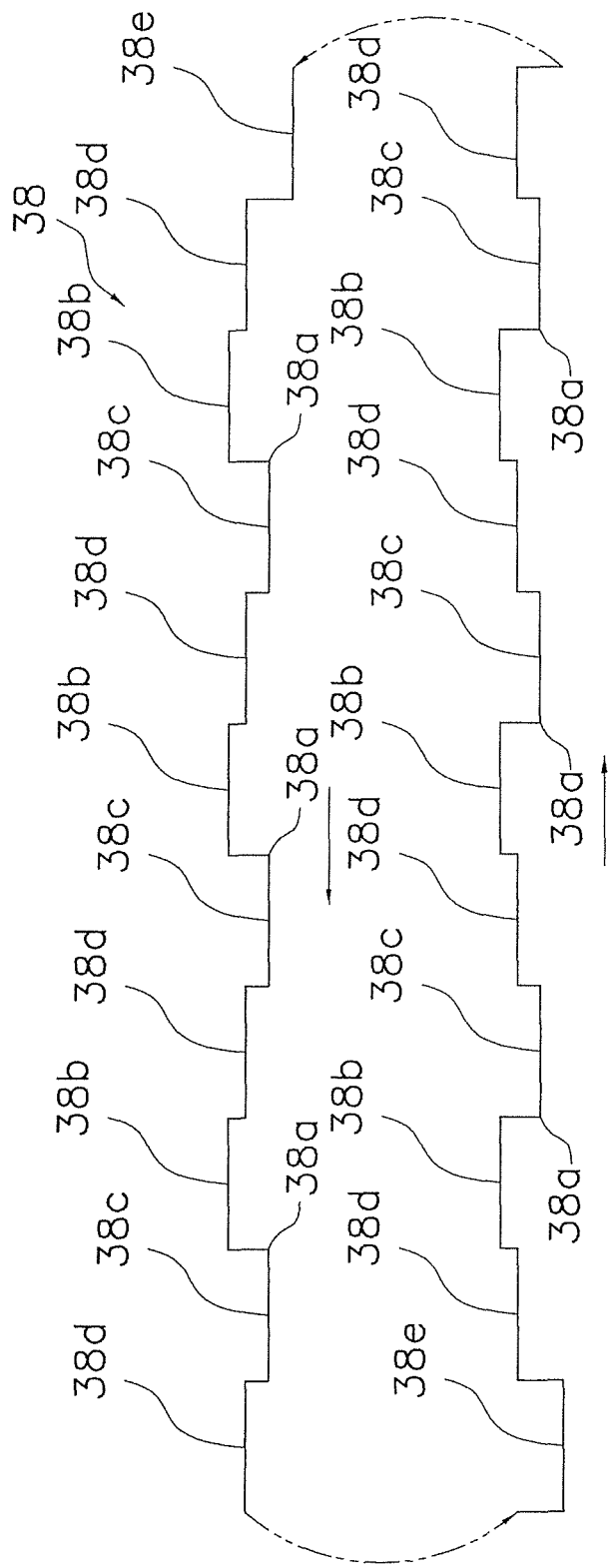
FIG. 9 is a simplified cross-sectional view taken along the cam groove.

More specifically, assuming the cam groove 38 is machined from the right end of FIG. 5, the end mill EM initially cuts into the work piece to a penetration depth corresponding to the depth DP4 of the fourth groove sections 38e. Then, the feed amount in the leftward direction of FIG. 5 is controlled and the penetration depth is controlled to the depth DP3 of the third groove sections 38d at the rotational phase shown in FIG. 8. As shown in FIG. 9, the penetration depth is varied so as to form first groove sections 38b, second groove sections 38c, and third groove sections 38d successively until the left end shown in FIG. 5 is reached and a fourth groove sections 38e are formed. During the machining of the fourth groove sections 38e, the feed direction is changed to a rightward direction. Then, the penetration depth is varied so as to form third groove sections 38d, first groove sections 38b, and second groove sections 38c successively until the fourth groove sections 38e on the right end is reached. The machining is then ended.

Constituent Features of the Intermediate Gear

As shown in FIGS. 2 and 3, the intermediate gear 22 is fixed non-rotatably to a tip end of the spiral shaft 21. The intermediate gear 22 meshes with the pinion gear 12 and rotates in synchronization with the rotor 3, which is rotated by rotating the handle assembly 1. The intermediate gear 22 serves to transmit rotation of the pinion gear 12 to the traverse camshaft 21 at a speed reduction ratio of approximately 1/2.5. Consequently, the reduction ratio is larger and the outer diameter of the intermediate gear 22 is larger than in prior reels.

Constituent Features of the Slider

As shown in FIG. 4, the slider 23 has a slider body 25 having a substantially rectangular shape and an engaging member 26 (example of an engaging member) mounted to the slider body 25 such that it can turn and such that it can move in an axial direction.

The slider body 25 is fixed to the spool shaft 15 such that it cannot rotate and cannot move axially with respect to the spool shaft 15, and the slider body 25 is slidably mounted onto two guide shafts 24a and 24b of the guide section 24. A portion of the spool shaft 15 where the slide body 25 is mounted is cut away so as to form a flat cut away portion 15a (FIG. 3) on the external circumference of the spool shaft 15. A fastening hole 25a for fastening the slider body 25 to the spool shaft 15 such that it cannot rotate and cannot move axially with respect to the spool shaft 15 is formed in the slider body 25 so as to run in an axial direction of the spool 4.

A larger rectangular portion is cut out of a front left corner portion of the slider body 25 and a guide hole 25b for passing a first guide member 24a is formed in the remaining portion. The guide hole 25b is formed to be parallel to the traverse camshaft 21. A pair of protrusions 25c is formed on a right side portion of the slider body 25, and guide holes 25d for passing a second guide shaft 24b are formed in the protrusions 25c so as to be parallel to the traverse camshaft 21. The guide holes 25d are formed in slightly lowered positions to the right of the fastening hole 25a. An elongated recessed portion 25i having a circular arc-shaped cross-sectional shape and arranged to face toward the traverse camshaft 21 is formed below the protrusions 25c. The recessed portion 25a is arranged such that a slight gap exists between the recessed portion 25i and the external surface of the traverse camshaft 21.

A mounting hole 25e oriented perpendicularly to the traverse camshaft 21 is formed in the portion where a rectangular portion was cut out. The mounting hole 25e is configured for turnably mounting the engaging member 26 such that the engaging member 26 points toward the cam groove 38 along a radial direction of the traverse camshaft 21. The mounting hole 25e is positioned at substantially the same height as the guide hole 25b. The engaging member 26 is mounted in the mounting hole 25e such that it can turn and can move in an axial direction. The engaging member 26 is turnably supported by a bush 27 mounted in the mounting hole 25e. The mounting hole 25e is covered with a cover member 28. The cover member 28 is a plate-like member and fastened to the slider body 25 with a screw 29a. The screw 29a is screwed into a threaded hole 25g formed in a protrusion 25f protruding from a frontward portion of the slider body 25.

A screw through hole 25h is formed in a left side face (close side in FIG. 4) of the slider body 25. A screw 29b is passed through the screw through hole 25h in order to install it into a threaded hole (not shown) formed in the spool shaft 15. In this way, the slider body 25 is fastened to the spool shaft 15.

The engaging member 26 is a generally shaft-like metal member having steps, i.e., different diameters, along its length. An engaging section 26a is formed on a tip end of the engaging member 26. The engaging section 26a is a plate-like section that protrudes along a diameter of the engaging member 26 and is configured to mesh with the cam groove 38 of the traverse camshaft 21. The engaging section 26a is tapered toward a tip end and the tip end of the engaging section 26a is recessed in a circular arc-shaped manner so as to mesh with the cam groove 38. The engagement between the engaging section 26a and the cam groove 38 causes the slider body 25 to move back and forth reciprocally when the traverse camshaft 21 rotates.

Constituent Features of the Guide Section

As shown in FIGS. 2 and 4, the guide section 24 has a first guide shaft 24a and a second guide shaft 24b. Both ends of the first guide shaft 24a are fixed to the reel body 2a and the first guide shaft 24a passes through the guide hole 25b as explained previously. The first guide shaft 24a is arranged to the outside of the engaging member 26 on the opposite side of the engaging member 26 as the traverse camshaft 21 (i.e., on a base end side of the engaging member 26).

Both ends of the second guide shaft 24b are fixed to the reel body 2a and the second guide shaft 24b passes through the guide holes 25d as explained previously. The second guide shaft 24b is thus arranged to the right of the traverse camshaft 21.

Since the first guide shaft 24a is arranged to the outside of the engaging member 26, it is not necessary to arranged a guide shaft below the traverse camshaft 21 as is the case when two guide shafts are arranged above and below the traverse camshaft. As a result, the space required for such an arrangement of guide shafts is no longer necessary and the size of the reel unit 2 can be reduced.

Constituent Features of the Spool

As shown in FIG. 2, the spool 4 is a shallow groove type spool and is arranged between the first rotor arm 31 and the second rotor arm 32 of the rotor 3. The spool 4 is connected to a tip end portion of the spool shaft 15 through a drag mechanism 60. The spool 4 has a bobbin trunk section 4a configured for a fishing line to be wound onto an external circumference thereof, a skirt section 4b formed integrally on a rearward portion of the bobbin trunk section 4a, and a flange section 4c provided on a front end of the bobbin trunk section 4a.

The bobbin trunk section 4a is a cylindrical member having approximately two overlapping cylinders with a boss in the center and is configured and arranged such that an external circumferential surface of an outer cylindrical portion is parallel to the spool shaft 15. The bobbin trunk section 4a is rotatably mounted to the spool shaft 15 with two bearings 56 and 57 that are attached to the boss. The skirt section 4b is a member having generally the shape of a bottomed cylinder that expands radially from a rearward end portion of the bobbin trunk section 4a and then extends rearward. The spool 4 is positioned by abutting against a positioning washer 54 that is attached to the spool shaft 15.

Operation of the Reel

With a spinning reel, the bail arm 40 is tilted over to a line release position during casting and other times when the fishing line is reeled out or allowed to reel out. As a result, the fishing line reels out from the distal end of the spool 4 due to the weight of a tackle attached to the fishing line.

During reeling in, the bail arm 40 is returned to a line reel-in position. When the handle assembly 1 is rotated in a line reel-in direction, the bail arm 40 automatically returns to the line reel-in position due to the action of a bail reversing mechanism (not shown). A torque applied to the handle assembly 1 is transmitted to the pinion gear 12 through the master gear shaft 10 and the master gear 11. The torque transmitted to the pinion gear 12 is transmitted to the rotor 3 from the front section 12a and to the traverse camshaft 21 through the intermediate gear 22 such that the traverse camshaft 21 rotates in the line reel-in direction.

Referring now to FIGS. 2 and 4, when the traverse camshaft 21 rotates in the line reel-in direction, the slider 23 moves back and forth reciprocally due to the engagement of the engaging section 26a of the engaging member 26 with the cam groove 38 and, thus, the spool 4 moves back and forth reciprocally. During the reciprocal movement, the engaging section 26a passes through a narrower first groove section 38b before passing through each of the intersecting portions 38a. As a result, turning of the engaging section 26a is restricted and the engaging section 26a is less likely to contact a corner portion of the intersecting portion 38a as it passes through the intersecting portion 38a. After passing through the intersecting portion 38a, the engaging section 26a engages with a second groove section 38c. Since the second groove sections 38c is wider than the first groove sections 38b, the engaging section 26a does not readily contact the second groove sections 38c. After the engaging section 26a passes through the second groove sections 38c, it passes through a third groove section 38d and engages with the next first groove section 38b. Since the third groove sections 38d are narrower than the second groove sections 38c and wider than the first groove sections 38b, the engaging section 26a is guided smoothly to the first groove sections 38b as it moves from the wider second groove sections 38c, through the third groove sections 38d, and into the narrower first groove sections 38b. Next, when the engaging section 26a engages with the fourth groove sections 38e, the movement direction begins to reverse.

Thus, in this embodiment, the engaging section 26a of the engaging member 26 can move directly from a first groove section 38b to an intersecting portion 38a to a second groove section 38c. Further, in this embodiment, the engaging section 26a of the engaging member 26 can move directly from a first groove section 38b to an intersecting portion 38a to a second groove section 38c to a third groove section 38d. Moreover, in this embodiment, the engaging section 26a of the engaging member 26 can move directly from a first groove section 38b to an intersecting portion 38a to a second groove section 38c to a third groove section 38d to return to another first groove section 38b. This pattern can be repeated until an end third groove section 38d located at an end of the grooved section is reached. Since the end third groove section 38d is arranged directly next to a fourth groove section 38e, the engaging section 26a moves directly from the end third groove section 38d to the fourth groove section 38e to another third groove section 38d before repeating one of the aforementioned patterns.

Since the engaging member 26 engages with a narrower first groove section 38b at a position downstream of each of the intersecting portions 38a, i.e., at a position along the cam groove 38 that the engaging member 26 reaches just before reaching the intersecting portion 38a when the traverse camshaft 21 is rotated in the reel-in direction, unnecessary turning of the engaging member 26 is suppressed before the engaging member 26 enters the intersecting portion 38a and the engaging member 26 is less likely to contact a corner portion of the intersecting portion 38a. Thus, the occurrence of abnormal noise and degradation of the operating feel caused by contact of the engaging member 26 against the intersection portion 38a are suppressed. Additionally, since the groove width widens after the engaging member 26 passes the intersecting portion 38a, the engaging member 26 does not readily contact the second groove portion 38c and the operating feel is less likely to decline. Consequently, unnecessary turning of the engaging member 26 is suppressed and the occurrence of abnormal noise and degradation of the operating feel can be suppressed.

When the traverse camshaft 21 rotates, the slider 23 moves back and forth and the rotor 3 rotates in the line reel-in direction while the spool 4 moves back and forth reciprocally. The slider 23 is guided by the two guide shafts 24a and 24b such that it moves smoothly back and forth.

Alternate Embodiments

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the second embodiment that are identical or similar to the parts of the first embodiment may be omitted for the sake of brevity.

Second Embodiment

Figure 10:
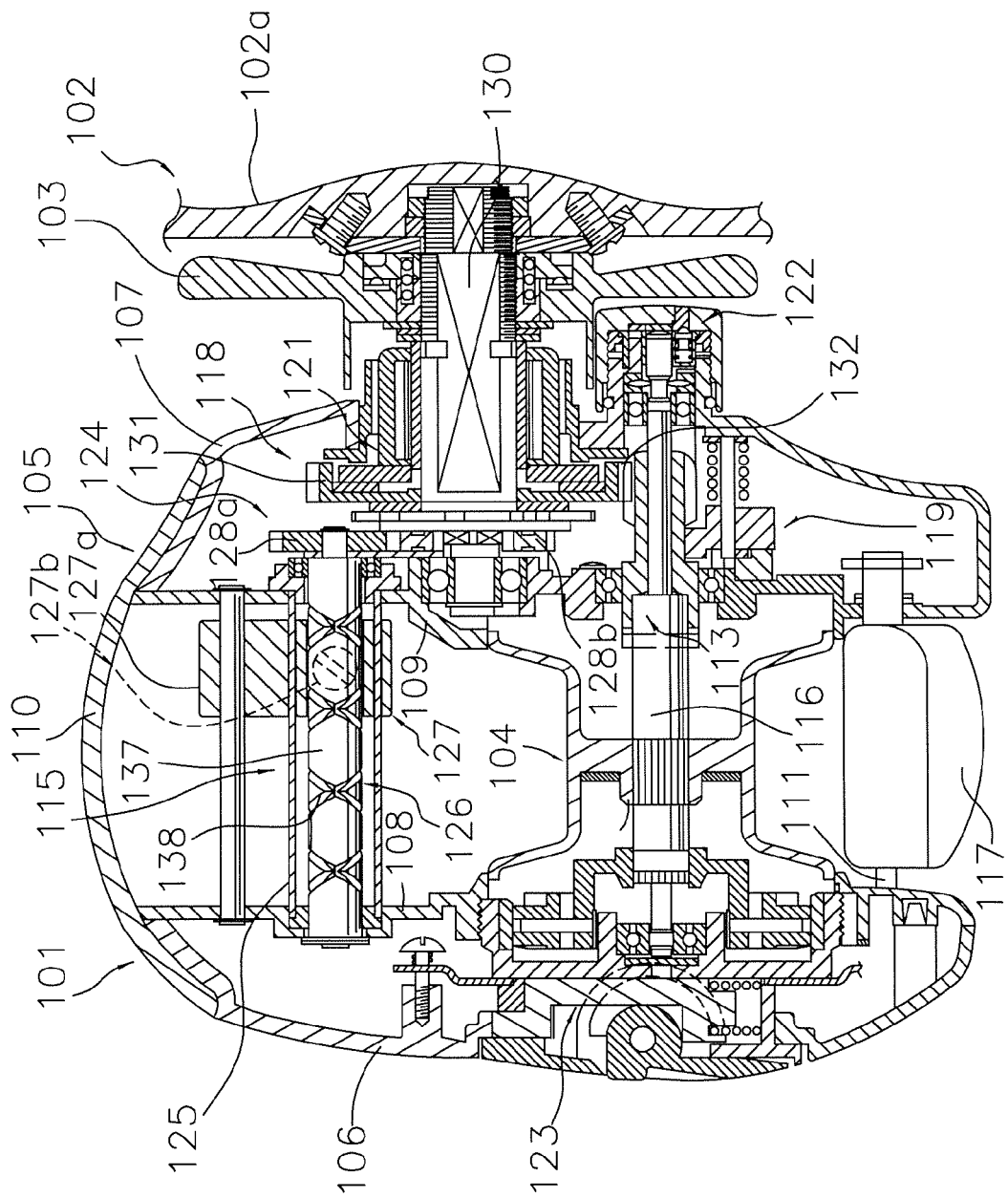
FIG. 10 is a horizontal cross-sectional view of a dual-bearing reel in accordance with a second embodiment.

FIG. 10 shows a dual-bearing reel in accordance a second embodiment. The dual bearing reel includes a reel unit 101, a handle assembly 102, a star drag 103 arranged on the reel unit 101 side of the handle assembly 102, and a spool 104. The handle assembly 102 is arranged on a side of the reel unit 101 and serves to rotate the spool 104. The handle assembly 102 has a plate-like arm part 102a and handle grips (not shown) mounted in a freely rotatable manner to both ends of the arm part 102a.

The reel unit 101 has a frame 105, first and second side covers 106 and 107 mounted on opposite sides of the frame 105, and a front cover 110 mounted on a front portion of the frame 105 such that it can be opened and closed.

The frame 105 has a pair of side plates 108 and 109 arranged facing each other with a prescribed space in-between and a plurality of connecting sections 111 arranged to connect the side plates 108 and 109 together. The spool 104 is arranged inside the frame 105 along with a level wind mechanism 115 (example of a reciprocal movement mechanism) for winding a fishing line onto the spool 104 in a uniform manner and a thumb rest 117 serving as a clutch operating piece and as a place for a user to place the thumb when thumbing.

The spool 104 is arranged integrally-rotatably to a spool shaft 116 passing through a center portion.

A rotation transmission mechanism 118 for transmitting torque from the handle assembly 102 to the spool 104, a clutch mechanism 113, a clutch operating mechanism 119 contrived to engage and disengage the clutch mechanism 113 in response to operation of the thumb rest 117, a drag mechanism 121, and a casting control mechanism 122 are arranged between the frame 105 and the second side cover 107. A centrifugal braking mechanism 123 for suppressing backlash during casting is arranged between the frame 105 and the first side cover 106.

The rotation transmission mechanism 118 has a main gear 131 that is fixed to a handle shaft 130 and a cylindrical pinion gear 132 arranged and configured to mesh with the main gear 131.

Constituent Features of the Level Wind Mechanism

The level wind mechanism 115 has a interconnecting mechanism 124 (example of a transmission mechanism) contrived to transmit rotation of the handle assembly 102, a guide pipe 125 (example of a guide section) fixed between the pair of side plates 108 and 109 and arranged parallel to the spool shaft 116, a traverse camshaft 126 rotatably supported inside the guide pipe 125 and having a cam groove 138 formed therein, and a fishing line guide section 127. The fishing line guide section 127 has a main body member 127a and an engaging member 127b that is attached to the main body member 127a and configured to engage with the cam groove 138.

The interconnecting mechanism 124 has a gear 128a fixed to an end portion of the traverse camshaft 126 and a gear 128b fixed non-rotatably to the handle shaft 130 and configured to mesh with the gear 128a. The interconnecting mechanism 124 serves to transmit rotation of the handle assembly 102 to the traverse camshaft 126.

The guide pipe 125 is arranged parallel to the spool shaft 116 and has an elongated slit formed in an external circumferential surface thereof. The slit extends in an axial direction and the engaging member 127b attached to the main body member 127a is arranged to extend from the groove toward the traverse camshaft 126.

The traverse camshaft 126 has a shaft body 137 and a cam groove 138 formed in an external circumferential surface of the shaft body 137. Similar to or the same as the first embodiment, the cam groove 138 has first to fourth groove sections (not shown). The engaging member 127b of the fishing line guide section 127 engages with the cam groove 138. Consequently, when the traverse camshaft 126 is rotated through the interconnecting mechanism 124, the fishing line guide section 127 moves reciprocally along the guide pipe 125.

How the dual-bearing reel operates will now be explained.

In order to reel in the fishing line, a user rotates the handle assembly 102 in a line reel-in direction. The rotation of the handle assembly 102 is transmitted to the handle shaft 130 and from the handle shaft 130 through the drag mechanism 121 to the main gear 131 and pinion gear 132 of the rotation transmission mechanism 118. The rotation of the pinion gear 132 is transmitted to the spool shaft 116 through the clutch mechanism 113, and the rotation of the spool shaft 116 causes the spool 104 to rotate and to wind up the fishing line. The rotation of the handle assembly 102 is transmitted from the handle shaft 130 to the gear 128b of the interconnecting mechanism 124 and from the gear 128b to the gear 128a of the interconnecting mechanism 124. As a result, the traverse camshaft 126 rotates and the fishing line guide section 127 moves reciprocally. Similar to or the same as the first embodiment, the engaging member 127b engages with a narrow first groove sections before passing through each of the intersecting portions of the cam groove 138 and enters a wider second groove sections after exiting each of the intersecting portions. Consequently, similar to the first embodiment, unnecessary turning of the engaging member 1 is suppressed and the occurrence of abnormal noise and degradation of the operating feel can be suppressed.

Meanwhile, when the fishing line is reeled out, a clutch lever (not shown) is operated to turn the clutch mechanism 113 off. As a result, the engagement between the spool shaft 116 and the pinion gear 132 is released and spool 104 can rotate freely without relation to the handle assembly 102. The spool 104 rotates and the fishing line is reeled out due to the weight of a tackle attached to the fishing line.

Distinctive Features (1) In the aforementioned embodiments, the engaging member 26 or 127b engages with a narrower first groove sections 38b at a position rotationally downstream of each intersecting portion 38a, i.e., at a position along the cam groove 38 that the engaging member reaches just before reaching the intersecting portion 38a when the traverse camshaft 21 or 126 is rotated in the reel-in direction. As a result, unnecessary turning of the engaging member 26 or 127b is suppressed before the engaging member 26 or 127b enters the intersecting portion 38a and the engaging member 26 or 127b is less likely to contact the intersecting portion 38a. Thus, the occurrence of abnormal noise and degradation of the operating feel caused by contact of the engaging member against the intersection portion can be suppressed. Additionally, since the groove width widens after the engaging member 26 or 127b passes through the intersecting portion 38a and into the second groove sections 38c, the engaging member 26 or 127b does not readily contact the second groove portion 38c and the operating feel is less likely to decline. Consequently, unnecessary turning of the engaging member 26 or 127b is suppressed and the occurrence of abnormal noise and degradation of the operating feel can be suppressed.

(2) Since the cross section shape of the cam groove 38 or 138 is an isosceles trapezoid, the same tool (e.g., an end mill EM) can be used to change both the depth and the width of the groove sections 38b to 38e. Consequently, the same type of tool can be used to machine groove sections (e.g., four types of groove sections) having different widths in a continuous fashion.

With this aspect, the groove width can be narrowed by making the groove shallower because the groove width can be changed by changing the depth of the groove 38b to 38e.

(3) The cam groove 38 or 138 is configured such that the third groove sections 38d are narrower than the second groove sections 38c and wider than the first groove sections 38b. Thus, a third groove section 38d that is narrower than a second groove section 38c is formed rotationally upstream of each of the second groove sections 38c, i.e., between each second groove sections 38c and the next upstream first groove sections 38b. Consequently, the engaging member 26 or 127b can be restricted by the third groove sections 38d that is narrower than the second groove sections 38c as it moves from a second groove sections 38c to a first groove sections 38b and the engaging member 26 or 127b can be guided more smoothly into the first groove sections 38b. As a result, turning of the engaging member 26 or 127b can be suppressed to an even greater degree.

(4) The cam groove 38 or 138 has fourth groove sections 38e that are wider than the second groove sections 38c and arranged at each of two end portions of the cam groove 38 pr 138. Thus, the cam groove 38 or 138 is configured to be widest at both end portions thereof, where the radius of curvature is small and the engaging member 26 or 127b is more likely to contact the cam groove 38 or 138. As a result, the engaging member 26 or 127b can move smoothly through both end portions of the cam groove 38 or 138.

Other Embodiments

The present invention is not limited to the embodiments explained heretofore and various changes can be made without departing from the scope of the invention as defined in the claims.

(a) The application of the present invention to a spinning reel is not limited to the first embodiment described previously. The present invention can be applied to any type of spinning reel, including a rear drag type spinning reel in which a spool shaft rotates with respect to a slider, a fixed handle type spinning reel in which the handle is fixed to the left or right side, and a lever brake type spinning reel in which a rotor is braked with a lever.

(b) The application of the present invention to a dual-bearing reel is not limited to the second embodiment described previously. The present invention can be applied to any dual-bearing reel having a level wind mechanism, e.g., a reel configured to transmit rotation of a spool to a traverse camshaft on the opposite side of the reel as the side where the handle is mounted.

(c) Although the width of the cam groove is varied in a step-like fashion in the embodiments, it is also acceptable for the groove to be configured such that the width varies in a continuous fashion. For example, if the cam groove has an isosceles trapezoidal cross-sectional shape, then the width can be varied by varying the depth in a continuous fashion.

(d) Although the cam groove has an isosceles trapezoidal cross-sectional shape in the embodiments, the present invention is not limited to such a shape. For example, the cam groove can be formed to have a fixed depth with only the width being varied.

(e) Although in the embodiments the traverse camshaft is made of metal and is formed by machining, the present invention is not limited to such a camshaft. For example, a pattern camshaft can be fabricated by machining and the pattern can be used to make dies which are then used to manufacture traverse camshafts. In such a case, a synthetic resin can be used to make the traverse camshaft instead of metal. It is also acceptable to use a combination of a metal and a synthetic resin.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including", "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of a fishing rod and/or reel equipped with the present invention. Accordingly, these terms, as utilized to describe the present invention should be interpreted relative to a fishing rod and/or reel equipped with the present invention as normally used. Finally, terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A traverse camshaft for a fishing reel configured to engage with an engaging member used to cause a fishing line guide section and a spool of the fishing reel to undergo a relative reciprocal movement, the traverse camshaft comprising:
    a shaft body arranged to be rotatable in coordination with rotation of a handle of the fishing reel in at least a line reel-in direction; and
    a endless spiral cam groove formed in an external circumferential surface of the shaft body, and configured to engage with the engaging member, an engaging point between the endless spiral cam groove being shifted in a direction from a upstream to a downstream when a fishing line is being wound,
    the endless spiral cam groove forming a first intersecting portion and a second intersecting portion being a next intersection to the first intersecting portion,
    the endless spiral cam groove including a first groove section being arranged next to the first intersecting portion on a side of the downstream and a second groove section being arranged next to the first intersecting portion on a side of the upstream,
    the endless spiral cam groove including a third groove section being arranged next to the second intersecting portion on a side of the downstream and a fourth groove section being arranged next to the second intersecting portion on a side of the upstream and between the first and second intersecting portions,
    the first groove section being narrower than the second groove section,
    the third groove section being narrower than the fourth groove section.

2. The traverse camshaft for a fishing reel recited in claim 1, wherein
    the cam groove is configured to have an isosceles trapezoidal cross-sectional shape such that the cam groove is wider at the external circumferential surface of the traverse camshaft and narrower at a bottom of the cam groove.

3. The traverse camshaft for a fishing reel recited in claim 2, wherein
    the cam groove is configured such that the first groove section is shallower than the fourth groove sections.

4. The traverse camshaft for a fishing reel recited in claim 3, wherein
    the cam groove has a fifth groove section arranged between the first and fourth groove sections
    the fifth groove section is narrower than the fourth groove section and wider than the first groove section, such that the engaging member is configured to move directly from the first groove section to the second intersecting portion to the second groove section, and directly from the fourth groove section to the fifth groove section when the traverse camshaft is rotated corresponding to a line reel-in direction.

5. The traverse camshaft for a fishing reel recited claim 4, wherein
    the cam groove has sixth groove section which is wider than the fourth groove section and arranged at an end portion of the shaft body.

6. The traverse camshaft for a fishing reel recited claim 3, wherein
    the cam groove has a two end groove sections each of which is wider than the fourth groove section and arranged at two end portions of the shaft body.

7. The traverse camshaft for a fishing reel recited in claim 2, wherein
    the cam groove has a fifth groove section arranged between the first and fourth groove sections and
    the fifth groove section is narrower than the fourth groove section and wider than the first groove section, such that the engaging member is configured to move directly from the fourth groove section to the fifth groove section.

8. The traverse camshaft for a fishing reel recited claim 7, wherein
    the cam groove has a sixth groove section which is wider than the fourth groove section and arranged at an end portion of the shaft body,
    the first, fourth, fifth, and sixth groove sections respectively have a first, fourth, fifth, and sixth outer width arranged at the external surface of the camshaft,
    the sixth outer width is larger than the fourth outer width,
    the fourth outer width is larger than the fifth outer width, and
    the fifth outer width is larger than the first groove section.

9. The traverse camshaft for a fishing reel recited in claim 8, wherein
    the first, fourth, fifth, and sixth groove sections respectively have a first, fourth, fifth, and sixth depth arranged to extend from the external surface of the camshaft toward an axis of rotation of the camshaft,
    the sixth depth is larger than the fourth depth,
    the fourth depth is larger than the fifth depth, and
    the fifth depth is larger than the first depth.

10. The traverse camshaft for a fishing reel recited claim 2, wherein
    the cam groove has a two end groove sections each of which is wider than the fourth groove section and arranged at two end portions of the shaft body.

11. A traverse camshaft for a fishing reel configured to engage with an engaging member used to cause a fishing line guide section and a spool of the fishing reel to undergo a relative reciprocal movement, the traverse camshaft comprising:
    a shaft body arranged to be rotatable in coordination with rotation of a handle of the fishing reel; and
    a endless spiral cam groove formed in an external circumferential surface of the shaft body, and configured to engage with the engaging member, an engaging point between the endless spiral cam groove being shifted in a direction from a upstream to a downstream when a fishing line is being wound,
    the endless spiral cam groove forming a first intersecting portion and a second intersecting portion being a next intersection to the first intersecting portion,
    the endless spiral cam groove including a first groove section being arranged next to the first intersecting portion on a side of the downstream and a second groove section being arranged next to the first intersecting portion on a side of the upstream, the endless spiral cam groove including a third groove section being arranged next the second intersecting portion on a side of the downstream and a fourth groove section being arranged next to the second intersecting portion on a side of the upstream and between the first and second intersecting portions, the first groove section being narrower than the second groove section, the third groove section being narrower than the fourth groove section.

\* \* \* \* \*